NEGATIVE RESISTANCE ANALOG TO DIGITAL CONVERTER

Filed Oct. 24, 1960 2 Sheets-Sheet 1

INVENTORS
JUAN J. AMODEI &
WALTER F. KOSONOCKY
BY John V. Regan
ATTORNEY

NEGATIVE RESISTANCE ANALOG TO DIGITAL CONVERTER

Filed Oct. 24, 1960 2 Sheets-Sheet 2

INVENTORS
JUAN J. AMODEI &
WALTER F. KOSONOCKY
BY John V. Regan
ATTORNEY

3,160,873
NEGATIVE RESISTANCE ANALOG TO DIGITAL CONVERTER

Juan J. Amodei, Levittown, Pa., and Walter F. Kosonocky, Iselin, N.J., assignors to Radio Corporation of America, a corporation of Delaware Filed Oct. 24, 1960, Ser. No. 64,356
10 Claims. (Cl. 340—347)

This invention relates to converters and, more particularly, to analog-to-digital converters.

Many devices, transducers for example, provide analog information in the form of a voltage or current whose magnitude is representative of a measured or sampled quantity. When this information is to be operated upon in a digital computer, for example, it is generally necessary to convert the analog information to the digital language of the computer.

It is an object of this invention to provide an improved analog-to-digital converter.

It is another object of this invention to provide improved apparatus for generating a series of pulses whose number is representative of the amplitude of an input signal.

It is still another object of this invention to provide apparatus of the type described which operates at high speed, yet which is simple in construction and inexpensive.

It is yet another object of this invention to provide apparatus of the type described which has a reduced number of components.

These and other objects are accomplished according to the invention by a plurality of directly connected active devices, each of which has a region of negative resistance in its operating characteristic, means for changing either the voltage across, or the current through, said devices in accordance with the amplitude of an input signal, and means for detecting the changes in current through, or voltage across, said devices, respectively, as said devices switch progressively through the negative resistance region.

In the accompanying drawing, like reference characters refer to like components, and:

Devices are known which have a region of negative resistance in their operating characteristic. One such device is a tunnel diode, a two-terminal device whose volt-ampere characteristic is N-shaped, having two regions of positive resistance separated by a region of negative resistance. A tunnel diode characteristic has a current "peak" at a low value of voltage, relatively speaking, and a current "valley" at a high value of voltage, again relatively speaking. The region between the current peak and current valley is the region of negative resistance. A device of this type often is referred to as a voltage-controlled device.

A sharp change in diode current is experienced under certain load conditions when the diode is switched through the negative resistance region. This change in current may be equal to the difference between the peak and valley current values in the extreme case, the exact change in any application depending upon the loading.

The operating characteristic of a plurality of serially connected tunnel diodes is a series of alternate current peaks and valleys, each occurring at a different value of voltage across the series chain. The voltage is a multivalued function of the current through the diodes. The current through the diodes, under certain operating load conditions, experiences a series of gradual rises and sudden drops as the voltage across the chain is increased over a sufficient range. Conversely, the current goes through a series of alternate sudden rises and gradual drops as the voltage across the chain is decreased over the same range.

Another known negative resistance device is one having an S-shaped volt-ampere characteristic. The voltage across a device of this type increases gradually, then drops, and again rises gradually under certain load conditions as the current through the device is increased from a low value. A device of this type is often referred to as a current-controlled device. The operating characteristic of a parallel group of such devices is a series of voltage "peaks" and "valleys," each occurring at a different value of current. That is to say, the current is a multivalued function of voltage.

Tunnel diodes are preferred as the negative resistance devices for use in practicing the present invention because of their inherent high speed and low power requirements. However, other types of active, negative resistance devices may be used instead of the tunnel diodes, in some cases without circuit modification, in other cases with minor circuit changes within the skill of the art, but in any event without departing from the spirit of the invention.

Figures 1, 4:
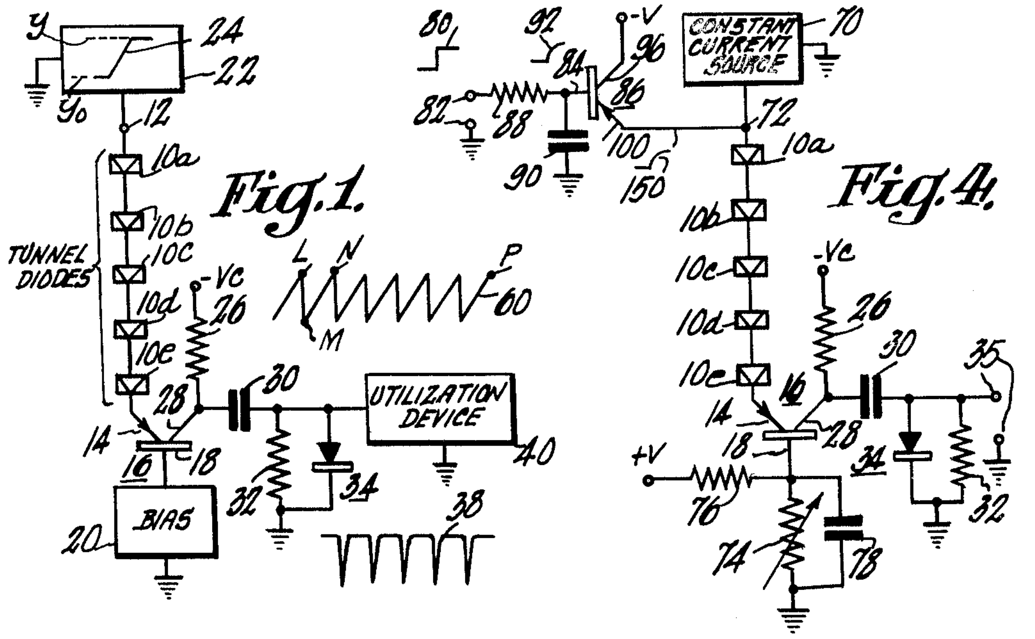
FIGURE 1 is a schematic circuit diagram of an embodiment of the invention wherein an input signal to be converted provides energization of a chain of serially connected negative resistance devices.
FIGURE 4 is another embodiment of the invention wherein an information signal to be converted is supplied to the chain of devices through an emitter-follower.

One embodiment of the invention is illustrated schematically in FIGURE 1. Five tunnel diodes 10_a_ . . . 10_e_ are connected in a series chain between a terminal 12 and the emitter electrode 14 of a PNP transistor 16. The exact number of diodes 10_a_ . . . 10_e_ shown in this and the other drawings is illustrative only. The base electrode 18 of the transistor 16 preferably is connected to a source 20 of D.C. bias for reasons which will be described more fully hereinafter. The bias source 20 may be, for example, a battery having one terminal connected to the base electrode 18, the other terminal thereof being connected to a point of reference potential, indicated schematically by the conventional symbol for circuit ground.

An input device 22 supplies analog voltage signals 24, to be converted, between the terminal 12 and reference ground. The diodes 10_a_ . . .10_e_ are poled in the forward direction with respect to positive current, in the conventional sense, flowing from the input device 22 to the emitter electrode 14. Although the input signals 24 are illustrated as positive-going signals, it will be apparent from a later discussion that these signals also may be negative-going, depending upon the circuit's quiescent bias.

A load impedance, for example a resistor 26, is connected between the collector electrode 28 and a bias source, $-V_c$, which supplies reverse bias for the collector with respect to the base. The bias source may be a battery (not shown) having its negative terminal connected to the upper end of the load resistor 26, and having its positive terminal connected to ground. A capacitor 30 and a resistor 32 are serially connected, in the order named, between the collector electrode 28 and circuit ground, and serve as a differentiating network. A conventional diode 34 may be connected in parallel with the resistor 32. The cathode of the diode 34, when present, is connected to ground for the case of positive input signals 24; the diode 34 is poled in the opposite direction from that illustrated in the case of negative-going input signals. The output 40 of the circuit may be applied to a utilization device 40, a binary counter, for example, connected between the ungrounded end of the resistor 32 and ground.

Figures 2, 3:
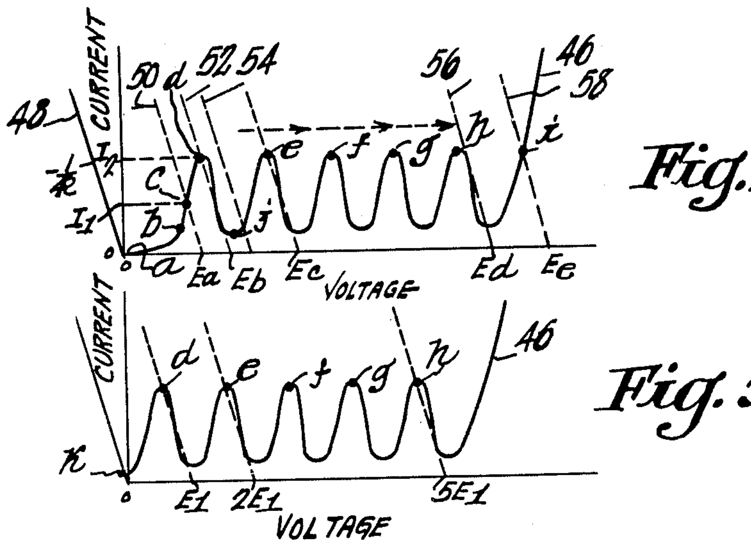
FIGURES 2 and 3 are volt-ampere characteristics useful in explaining the operation of the FIGURE 1 circuit.

A combined volt-ampere characteristic 46 for the chain of tunnel diodes 10*a* . . . 10*e* and transistor 16 is illustrated in FIGURE 2 for the condition of zero base 18 bias. The portion *a–b* of the characteristic curve 46 roughly is the contribution of the transistor 16. The characteristic of the transistor 16 is represented as the current flowing into the emitter electrode 14 as a function of the voltage between emitter 14 and base 18 with the collector suitably biased.

The load line for the series combination has a slope $-1/R$, where R is the resistance of the input device 22. The solid line 48 passing through the coordinates (0, 0) is the load line for the case of no input signal, corresponding to the level $Y_0$ adjacent the input signal 24. The load line translates to the right as the voltage input signal 24 increases in amplitude in a positive direction. The dashed lines 50 . . . 58 indicate the positions of the load line for different amplitudes of input signal 24.

The current flowing through the diodes 10*a* . . . 10*e* and into the emitter 14 for any given input condition is determined by the intersection of the load line corresponding to that input with the characteristic curve 46. For example, dashed line 50 represents the load line when the input signal 24 has an amplitude $E_a$ volts. This load line 50 intersects the characteristic 46 at a point *c*. The current through the series chain then has a value $I_1$. Most of the current into the emitter flows to the collector; only a small portion thereof, $I_e(1-a)$, flows to the base, where $I_e$ is the current flowing into the emitter and *a* is the alpha of the transistor 16.

The diode current (and, hence, the collector 28 current) increases gradually as the input voltage increases to a value $E_b$. Dashed line 52 is the load line for the condition of $E_b$ input volts. The current is a maximum at this time, having a value $I_2$ corresponding to the intersection *d* of the load line 52 with the characteristic curve 46. The collector current also is a maximum at this time and the collector voltage may correspond to the point L on the waveform 60 (FIGURE 1). Current through the diodes 10*a* . . . 10*e* drops sharply with the next incremental increase in input voltage as one of the diodes 10*a* . . . 10*e* is switched through the negative resistance region, and then increases gradually, relatively speaking, as the input voltage is increased to a value $E_c$. Of course, the slope of the load line should be less than the slope of the combined characteristic in the regions of switching, region *dj* for example. The collector 28 voltage immediately after the sudden drop in current is denoted by the letter "M" on the waveform 60. The collector 28 voltage for an input signal of $E_c$ volts is denoted by the letter "N" on the same waveform 60. The diode current experiences a series of gradual rises and sudden drops as the input volts rises from zero volts to a value, for example, of $E_e$ volts. The voltage at the collector electrode 28 corresponds to point *p* on the waveform 60 when the amplitude of the input signal 24 is $E_e$ volts.

The waveform 60 of voltage at the collector electrode 28 for a steadily increasing voltage input signal 24 resembles closely a series of saw tooths, as may be seen in FIGURE 1. The combination of capacitor 30 and resistor 32 differentiates this saw-tooth waveform 60 to provide a series of negative-going spikes or pulses (see waveform 38, FIGURE 1). These negative-going pulses may be applied to a utilization device 40 which may be, for example, a binary counter providing a binary output equivalent to the number of pulses applied thereto.

The load line translates to the left to the position occupied by solid line 48 when the input signal 24 is removed. A series of gradual current decreases and sudden current rises is experienced by the diodes 10*a* . . . 10*e* as the load line traverses the characteristic curve 46 in a leftward direction. Positive-going spikes or pulses ordinarily would be developed across the resistor 32 in the differentiating network. However, the diode 34 in parallel with this resistor 32 eliminates these positive spikes. The diode may be eliminated if the utilization device 40 is one which is responsive only to negative input pulses.

It is desirable in the interests of accurate signal conversion that successive output voltage spikes occur in response to equal increments of input voltage. These spikes occur as the load line passes points *d* . . . *h* on the characteristic 46 of FIGURE 2. Successive ones of these points are equidistant from each other voltage-wise, assuming identical diodes 10*a* . . . 10*e*. However, because of the contribution *ab* of the transistor 16 to the characteristic curve 46, the increment of voltage from zero input volts to an input of $E_b$ volts is greater than that corresponding, for example, to the difference between $E_c$ and $E_b$. This condition may be remedied, in the example given, by applying a small negative bias to the base electrode 18. The effect of this added bias is to shift the characteristic curve 46 to the left, as illustrated in FIGURE 3. The amount of bias added is such as to equalize the voltage increments $0-E_1$, $E_1-2E_1$, etc., as shown in FIGURE 3. A small current, corresponding to point *k*, then flows through the diodes 10*a* . . . 10*e* in the quiescent condition.

Conversion to digital form of negative-going analog input signals also may be accomplished by the FIGURE 1 circuit. To achieve this end, the transistor 16 base may be quiescently biased with a large negative voltage from the bias source 20. The quiescent operating point may be the point *i* of intersection of load line 58 and the characteristic curve 46. The negative-going analog signal is applied between the terminal 12 and ground. The load line translates to the left an amount proportional to the amplitude of the negative-going input signal. The current through the diodes 10*a* . . . 10*e*, and the voltage at the collector electrode 28, then go through a series of alternate gradual decreases and sudden rises. The change in voltage at the collector electrode 28 is differentiated by the combination of the capacitor 30 and the resistor 32 to provide a series of positive output spikes or pulses. For this reason, the diode 34 must be reversed; that is, the anode of the diode 34 is then connected to ground and the cathode thereof is connected to the junction between the capacitor 30 and the resistor 32.

Another embodiment of an analog-to-digital converter according to the invention is illustrated schematically in FIGURE 4. A source 70 supplies constant current in the positive direction, in the conventional sense, to a junction point 72. A chain of tunnel diodes 10*a* . . . 10*e* is connected in series between the junction point 72 and the emitter electrode 14 of a transistor 16. Two resistors 74, 76 are connected in series between circuit ground and a source of positive voltage, +V, and form a voltage divider. The base electrode 18 of the transistor 16 is connected to a tap on the voltage divider. Either or both of the resistors 74, 76 may be made variable to provide for adjustment of the base voltage. A capacitor 78 is connected between the base electrode 18 and ground as a by-pass to maintain the voltage constant at the base during switching. The voltage divider may be replaced by a battery, if it is so desired. The voltage divider serves the same general function as the bias source 20 in the FIGURE 1 circuit.

Positive input signals 80 to be converted are applied at a pair of input terminals 82. One input terminal is connected to the base electrode 84 of a transistor 86 by way of a resistor 88, the other input terminal of the pair being grounded. A capacitor 90 is connected between the base electrode 84 and ground. The resistor 88, capacitor 90 combination serves to deteriorate somewhat the leading edge of the input pulses 80, as may be seen by the input waveform 92 at the base electrode. The purpose of deteriorating the leading edge of an input pulse is to prevent the tunnel diodes 10*a* . . . 10*e* from switching so rapidly that the output pulses are indistinguishable from one another.

The collector electrode 96 is connected to a source of bias voltage, designated —V. The transistor 86 is connected as an emitter-follower to provide a low output impedance. The emitter electrode 100 is connected to the junction point 72.

Figures 5, 6, 7, 9:
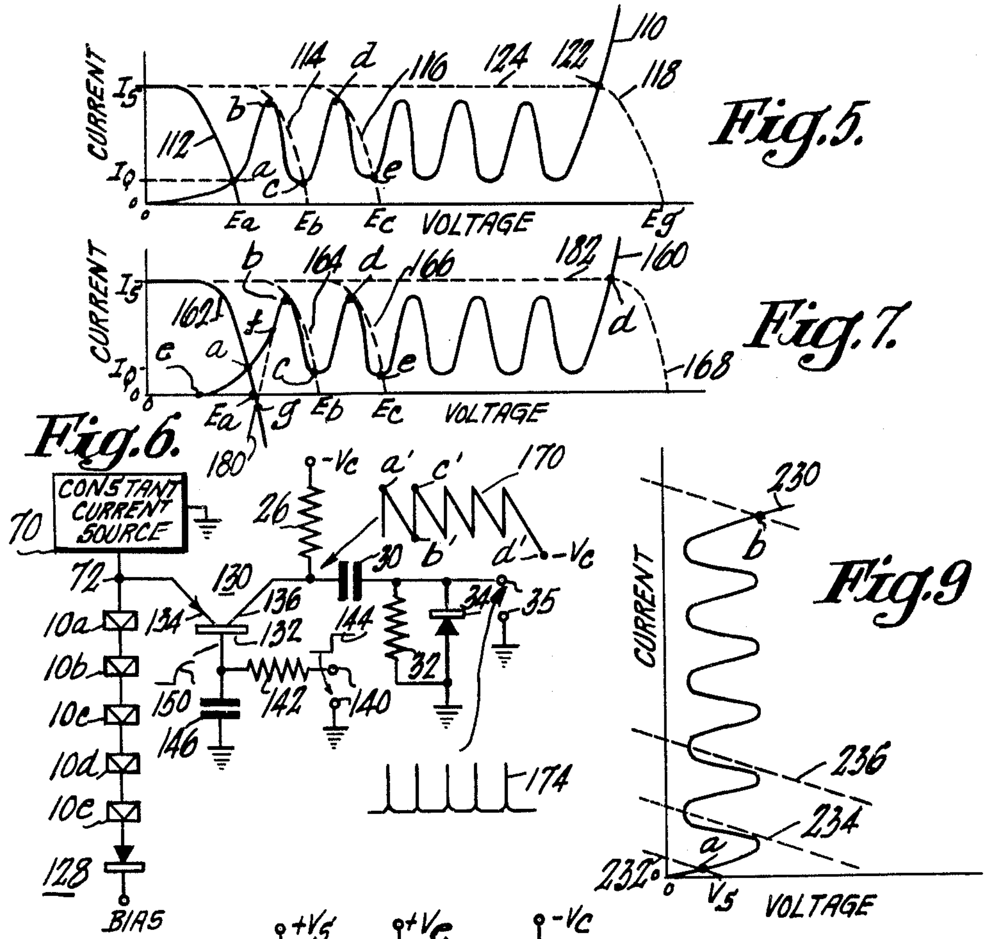
FIGURE 5 is a volt-ampere characteristic useful in explaining the operation of the FIGURE 4 circuit.
FIGURE 6 is a schematic circuit diagram of still another embodiment of the invention wherein the signal to be converted is applied to the base of a transistor whose emitter-base diode is conected in parallel with a series chain of negative resistance devices.
FIGURE 7 is a volt-ampere characteristic useful in explaining the operation of the FIGURE 6 circuit.
FIGURE 9 is a volt-ampere characteristic useful in explaning the operation of the FIGURE 8 circuit.

Operation of the FIGURE 4 circuit is generally similar to that of the FIGURE 1 circuit and may best be described with reference to the volt-ampere characteristic of FIGURE 5. The combined volt-ampere characteristic of the tunnel diode chain and transistor 16 is illustrated in FIGURE 5 by undulated curve 110. The positive bias applied to the base of the transistor 16 has the effect of shifting the characteristic 110 to the right, as seen in FIGURE 5, and is provided for purposes which will be described hereinafter. The current source 70 supplies constant current of magnitude $I_s$ to the junction point 72. The emitter of transistor 86 is connected effectively in parallel with the tunnel diodes and transistor. Consequently, the constant current source 70 and the transistor 86 combination may be considered as the load on the series chain of tunnel diodes 10*a* . . . 10*e* and the series of transistor 16.

The solid curve 112 is the load line for the series chain of diodes 10*a* . . . 10*e* and the transistor 16 for the condition of zero input signal. This load line 112 intersects the characteristic curve 110 at a point *a* and intersects the abscissa at a point marked $E_a$ volts. The point *a* denotes the operating state of the circuit in the quiescent condition. A quiescent current $I_q$, corresponding to the point *a*, flows though the tunnel diodes 10*a* . . . 10*e* and into the emitter of the transistor 16. The remaining current $I_s$–$I_q$ supplied by the constant current source 70 must flow into the emitter of the input transistor 86.

The voltages at both the base and the emitter of the input transistor 86 increase in the positive direction in response to a positive-going input signal 80. The operating load line for the tunnel diode circuit then translates to the right, as viewed in the drawing. The amount of translation of the load line is a function of the amplitude of the input signal. The dashed curves 114, 116 and 118, intersecting the abscissa at points marked $E_b$, $E_c$ and $E_g$, respectively, are operating load lines for different values of voltage at the emitter of the input transistor 86.

The current flowing through the tunnel diodes 10*a* . . . 10*e* and into the emitter of the transistor 16 for any condition is always given by the intersection of the curve 110 and the load line for that condition. It may be seen from the curve of FIGURE 5 that, as the emitter 100 voltage is progressively increased from the quiescent value, the tunnel diode current increases gradually, relatively speaking, from a value $I_q$, corresponding to point *a*, to a high value corresponding to point *b*. The current then drops sharply to a value corresponding to point *c* and again rises gradually to a value corresponding to point *d*. Further alternate sudden drops and gradual rises in tunnel diode current are experienced as the emitter 100 voltage continues to rise. Eventually, all of the source 70 current flows into the tunnel diodes 10*a* . . . 10*e* if the amplitude of the input signal 80 is large enough to cut off the input transistor 86. The operating condition of the circuit in that case is given by the point 122 of intersection of the constant current line 124 and the characteristic curve 110.

The emitter 14 input current flows to the collector of transistor 16 almost in its entirety, the exact proportion depending upon the beta of the transistor 16. The collector 28 voltage experiences a series of saw-tooth excursions due to the series of gradual rises and sudden drops in tunnel diode current. The waveform of voltage at the collector electrode 28 is much like that illustrated by the waveform 60 of FIGURE 1. These saw-tooths of voltage are differentiated by the network comprising the capacitor 30 and the resistor 32 to provide a series of negative-going spikes, or pulses, at the output terminals 35. As in the FIGURE 1 circuit, the transistor 16 provides voltage gain.

A negative output pulse occurs each time the tunnel diode current drops sharply, that is each time a tunnel diode is switched through its negative resistance region. Successive output pulses are generated in response to successive equal increments of voltage increase at the emitter electrode 100, assuming identical tunnel diodes 10*a* . . . 10*e*. It is desired that the first such pulse occur in response to a like voltage increment, starting from the quiescent condition. To achieve this desired end, the positive bias at the base of the output transistor 16 is adjusted to shift the combined characteristic 110 to the right an amount such that the voltage increments ($E_b$–$E_a$) and ($E_c$–$E_b$) of FIGURE 5 are equal.

The FIGURE 4 circuit also may be operated to convert a negative-going input signal to a series of pulses whose number is representative of the amplitude of the input signal. The input transistor 86 then may be quiescently biased, for example, in the cutoff condition. The load line for zero input signal may be the dashed curve 118. The load line translates to the left, as viewed in FIGURE 5, as the emitter 100 voltage increases in a negative direction in response to a negative input signal. The current through the tunnel diodes 10*a* . . . 10*e* alternately decreases gradually and increases sharply. Positive spikes are developed across the resistor 32 and, for this reason, the diode 34 must be poled in a sense opposite that illustrated in FIGURE 5.

A further embodiment of the invention is illustrated schematically in FIGURE 6. A current source 70 supplies positive D.C. current, in the conventional sense, to a junction point 72. A string of tunnel diodes 10*a* . . . 10*e* are conected in series between the junction point 72 and the anode of a conventional diode 128. The cathode of the diode 128, which may be, for example, a germanium diode, is connected to a bias source such as a battery (not shown). The diode 128 is not essential to the operation of the circuit, but is desirable in certain applications for reasons which will be described hereinafter.

A transistor 130 having base 132, emiter 134, and collector 136 electrodes has its emitter-base diode connected effectively in parallel with the series chain of tunnel diodes 10*a* . . . 10*e*. The emitter electrode 134 is connected to the junction point 72. The base electrode is connected to one of a pair of input terminals 140 by way of a resistor 142, the other input terminal of the pair being grounded. A signal input source (not shown) applies voltage signals 144, to be converted, at the input terminals 140. A capacitor 146 is connected between the base electrode 146 and ground. The combination of the resistor 142 and the capacitor 146 deteriorates the leading edge of the input signals 144 for reasons aforesaid. The voltage at the base electrode 132 in response to a signal 144 may be as shown illustratively by the waveform 150.

The collector electrode 136 is connected to a source $-V_c$ of bias by a load resistor 26. A differentiating network of the type illustrated in FIGURES 1 and 4, and described previously, is connected between the collector electrode 136 and ground. It is to be noted that the diode 34 in the differentiating network is poled in a direction opposite that illustrated in FIGURES 1 and 4.

Operation of the FIGURE 6 circuit is similar generally to the operation of the circuits of FIGURES 1 and 4. Accordingly, only the major differences will be described in detail. The solid, undulated curve 160 of FIGURE 7 is the combined volt-ampere operating characteristic of the series chain of tunnel diodes 10*a* . . . 10*e* and the conventional diode 128. The transistor 130 acts as a load on the series chain. The load line, therefore, is the inverted volt-ampere characteristic looking into the emitter electrode 134. The solid curve 162 is the load line for the condition of zero analog input signal.

The load line 162 intersects the characteristic curve 160 at a point *a*. A quiescent current $I_q$, corresponding to the point *a*, flows through the tunnel diodes in the forward direction at this time. The emitter 134 current is the difference between the source 70 current and the tunnel diode current, and has a value $I_s - I_q$ in the quiescent condition. The current flowing through the diode chain experiences a series of alternate gradual increases and sharp decreases as the load line translate to the right, as viewed in FIGURE 7, in response to a positive input signal 144. The emitter 134 current, and the voltage at the collector 136, however, experience a series of alternate gradual decreases and sudden increases. The dashed curves 164, 166, 168 indicate positions of the load line for different values of positive voltage at the base electrode 132.

The waveform of voltage at the collector electrode 136, in response to a positive input signal 144, is illustrated by the waveform 170 in FIGURE 6. Points *a'* . . . *d'* on the waveform 170 correspond to points *a* . . . *d*, respectively, on the characteristic 160. The voltage at the collector electrode 136 is a negative maximum, $-V_c$, corresponding to the point *d'* on the waveform 170, when the voltage at the base electrode 132 is sufficiently positive to cut off the transistor 130. The operating state of the diode chain for this condition is given by point *d* on the characteristic curve of FIGURE 7. As may be seen in FIGURE 7, all of the source 70 current $I_s$ then flows through the tunnel diodes 10*a* . . . 10*e*.

The differentiating network comprising the capacitor 30 and the resistor 32 differentiates the saw tooths of voltage appearing at the collector electrode 136 to provide a series of positive spikes or pulses. Each different spike occurs as a different tunnel diode is switched through its negative resistance region. The diode 34 connected across the output terminals 35 prevents the generation of negative output pulses when the input signal 144 terminates.

The bias (positive in the example) applied to the cathode of the conventional diode 128 serves to shift the characteristic curve 160 to the right, as viewed in FIGURE 7. The bias is adjusted so that the quantity $(E_b - E_a)$ is equal to the quantity $(E_c - E_b)$. When this condition obtains, successive output pulses are generated in response to successive, equal base 132 voltage increases, beginning with the quiescent condition.

The portion *ef* at the left of the characteristic curve 160 is contributed by the conventional diode 128. It was stated hereinabove that this diode 128 is not essential to the operation of the circuit. In the absence of the diode 128, however, the characteristic curve 160 has a beginning portion indicated by the dashed line 180, which extends below the abscissa. The quiescent load line 162 intersects this dashed line 180 at a point *g*, indicating that quiescent current would flow through the tunnel diodes 10*a* . . . 10*e* in the reverse direction for the loading conditions given. This condition is prevented, and higher operating speed thereby obtained, by connecting the conventional diode 128 in series with the tunnel diodes 10*a* . . . 10*e*.

The FIGURE 6 circuit also may be operated to convert negative-going voltage input pulses to digital form. To accomplish this, the transistor 130 may be biased quiescently in the cutoff or near-cutoff condition. The quiescent operating condition of the tunnel diode chain may be, for example, at the point *d* of intersection of the constant current line 182 and the characteristic curve 160. The load line then translates to the left in response to a negative input signal. It is necessary to reverse the diode 34 in the output circuit for this type of operation. The quiescent bias aforementioned may be provided by applying a negative voltage of suitable magnitude to the cathode of the diode 128 in the series chain.

Typical component values for the circuit of FIGURE 6 may be as follows when the tunnel diodes are 5 milliamp peak diodes:

| | | |
|---|---|---|
| Transistor **130** | | 2N501 |
| Resistor **26** | ohms | 2.2K |
| Capacitor **30** | μμfarads | 20 |
| Resistor **32** | ohms | 8.2K |
| Resistor **142** | do | 150 |
| Capacitor **146** | μfarads | 0.01 |

Figure 8:
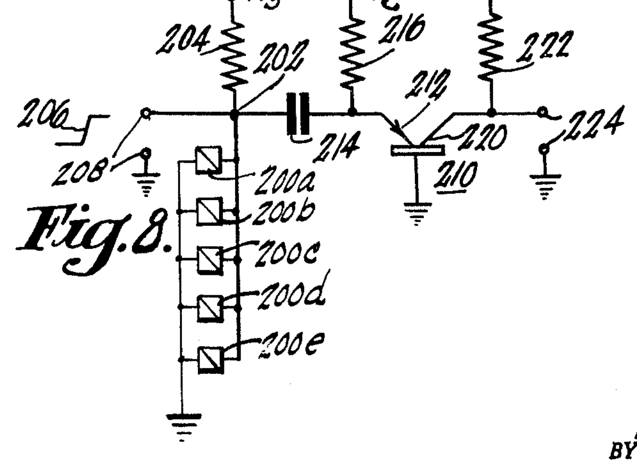
FIGURE 8 is an embodiment of the invention employing current-controlled negative reistance devices.

An embodiment of an analog-to-digital converter employing current-controlled, negative resistance devices is illustrated schematically in FIGURE 8. A suitable device is one having an S-shaped volt-ampere characteristic, that is, one whose volt-ampere characteristic has two regions of positive resistance separated by a region of negative resistance. A device of this type has a voltage "peak" at a low value of current, relatively speaking, and a voltage "valley" at a high value of current. Among the known devices possessing such characteristics are certain types of point contact diodes.

In FIGURE 8, a plurality of negative resistance diodes is directly connected in parallel between a junction point 202 and circuit ground. Five diodes 200*a* . . . 200*e* are shown in the drawing; it should be understood, however, that this number is illustrative only. A resistor 204 has one end connected to the junction point 202 and the other end connected to a source of positive voltage designated $+V_s$. Positive input current pulses 206 are applied at a pair of input terminals 206, one of which is connected to the junction point 202 and the other of which is grounded.

A PNP transistor 210 is connected in the circuit to provide an output pulse whenever any of the diodes 200*a* . . . 200*e* is switched through its negative resistance region. The transistor 210 may be connected in the grounded base configuration. The emitter electrode 212 is A.C. coupled to the junction point 202 by a capacitor 214, and is connected to a biasing source $+V_e$ by a resistor 216. The source $+V_e$ forward biases the emitter with respect to the base in the quiescent condition. A load resistor 222 is connected between the collector electrode 220 and the negative terminal of a collector biasing source, $V_c$.

The combined volt-ampere characteristics for the group of diodes 200*a* . . . 200*e* is illustrated in FIGURE 9 by the curve 230. It should be noted that the current is a multivalued function of the voltage across the diodes. The solid line 232 intersecting the abscissa at a voltage value of $+V_s$ is the load line for the condition of zero input signal. The slope of this line 232 is $-1/R$, where R is the resistance of the series resistor 204.

The input pulse 206 has a non-vertical leading edge for reasons explained heretofore. The load line translates upward in a vertical direction, as viewed in the drawing, when a positive current pulse 206 is applied at the input terminals 208. Dashed lines 234, 236 illustrate the position of the load line for two different values of input signal amplitude. The voltage across the diode chain experiences a series of alternate gradual increases, relatively speaking, and sudden decreases as the input signal amplitude increases over a sufficient range. Each sudden decrease in voltage occurs when a different diode is switched through its negative resistance region.

The combination of the capacitor 214 and the resistor 216 differentiates the sudden voltage drops appearing at the terminal 202 to provide an equal number of negative-going pulses at the emitter electrode 212. These negative pulses are preferably of sufficient amplitude to cut off the normally conducting transistor 210. In any event, a negative-going output pulse appears across the output terminals 224 in response to each of the sudden voltage decreases aforementioned. These output pulses may be applied to a binary counter (not shown), for example, or other suitable utilization device. Provision for blocking the positive-going output signals is not shown in the drawing.

The FIGURE 8 circuit also may be operated to convert negative-going input signals to digital form. In this case, the voltage $V_S$ may be increased to a high positive value to initially bias the diodes to the point *b* on the operating curve 230, for example. The load line then translates downward in a vertical direction in response to negative input current pulses. Positive pulses appear at the emitter electrode 212 in response to the sudden voltage increases as the diodes switch through the negative resistance region. For this reason, the transistor 210 should then be biased quiescently in the cutoff, or near-cutoff, condition.

What have been described above and illustrated are several circuits suitable for practicing the present invention. It will be understood that various modifications may be made in these circuits without departing from the spirit of the invention. For example, it will be apparent to those skilled in the art that NPN transistors may be substituted for the PNP transistors provided that the necessary changes are made in the polarities of the bias sources and input signals and the poling of the negative resistance devices. Also, although the invention has been described with particular reference to tunnel diodes and point contact diodes, it will be appreciated that this reference is in no way to be construed as limiting the invention. The invention may be precticed using other negative resistance devices possessing suitable operating characteristics.

What is claimed is:

1. The combination comprising: a plurality of active devices electrically connected in a chain and each having a region of negative resistance in its operating characteristic; means for applying an input signal to said chain for changing one of the currents into and voltage across all of said diodes in said chain an amount proportional to the amplitude of said input signal; and means connected to said chain for providing an output indication each time any of said devices is switched through its said negative resistance region.

2. The combination comprising: a plurality of negative resistance, active devices electrically connected in a group, the combined volt-ampere characteristic of said plurality having a series of alternate peaks and valleys; means for applying an input signal to said group having an amplitude proportional to an analog quantity; means for loading said devices such that one of the currents into and voltage across said group experiences a series of sharp decreases and sharp increases as the amplitude of said input signal increases and decreases, respectively; and means connected to said group for detecting each of said sharp changes.

3. An analog-to-digital converter comprising, in combination: a pair of terminals; a plurality of negative resistance devices connected between said terminals, each of said devices having a volt-ampere characteristic including two regions of positive resistance separated by a region of negative resistance; impedance means connected as a load on said devices and providing a load line having a slope slightly less than the slope of said characteristic in said negative resistance region; means for applying an analog input signal across said terminals for changing one of the currents into and voltage across said devices in proportion to the amplitude of said analog signal; and an output means connected to said devices for providing an output signal each time any of said devices is switched through its said negative resistance region.

4. The combination comprising: a series chain of active, voltage-controlled devices each having a region of negative resistance in its operating characteristic; a pair of input terminals for receiving an input signal; means connected between said chain and said input terminals for changing the voltage across said chain an amount proportional to the amplitude of said input signal; and means connected to said chain for detecting the changes in current through said chain as individual ones of said devices are switched through the negative resistance region.

5. The combination comprising: a series chain of tunnel diodes each having an operating region of negative resistance; a transistor having an emitter connected to one end of said chain, a base and a collector; means for applying a variable voltage between the other end of said chain and said base; and means connected to said collector for detecting the changes in current through said diodes as any of said diodes is switched through the negative resistance region.

6. The combination comprising: a series chain of voltage-controlled, negative resistance diodes each having an operating characteristic defined by two regions of positive resistance separated by a region of negative resistance; means for loading said chain such that the current through said chain experiences a series of sudden changes as said diodes are switched sequentially through said negative resistance region in response to a change in voltage across said chain; means responsive to an input signal for applying a voltage across said chain; and means connected to said chain for detecting said sudden changes.

7. The combination comprising: a point of reference potential; a series chain of negative resistance diodes having one end connected electrically to said reference point, each of said diodes having two regions of positive resistance separated by a region of negative resistance in its operating characteristic; a transistor having a base electrically connected to said reference point, an emitter connected to the other end of said chain, and a collector; output means connected to said collector; and means for applying an input signal to said base.

8. The combination comprising: a point of reference potential; a series chain of negative resistance diodes electrically connected at one end to said point and having a combined operating characteristic wherein the voltage across said chain is a multi-valued function of current through said diodes; a transistor having an emitter connected to the other end of said chain, a base, and a collector; means for connecting a source of current between said other end and said point; output means connected to said collector; and means for applying an input signal between said base and said point.

9. The combination comprising: a point of reference potential; a series chain of negative resistance diodes electrically connected at one end to said point and having a combined operating characteristic wherein the voltage across said chain is a multi-valued function of the current through said diodes; a transistor having an emitter connected to the other end of said chain, a base, and a collector; means for applying a quiescent bias to said chain; an impedance element connected at one end to said collector; means for applying a bias between the other end of said elements and said point; a differentiating network connected between said collector and said point; and means for applying an input signal between said base and said point.

10. In apparatus for converting an analog current signal to a series of pulses of number proportional to the amplitude of said signal, the combination of: a parallel group of current-controlled, negative resistance devices, each of said devices having two regions of positive resistance separated by a region of negative resistance in its operating characteristic; means for applying a said analog signal to said group to change the current into said diodes an amount proportional to the amplitude of said signal;

and means connected to said diodes for detecting changes in voltage across said group as individual said devices are switched through said negative resistance region.

References Cited in the file of this patent

UNITED STATES PATENTS 2,856,544 Ross ------------------ Oct. 14, 1958

OTHER REFERENCES

Publication I: Analog to Digital Converter, by R. A. Henle, "IBM Technical Disclosure Bulletin," vol. 3, No. 3, August 1960, pp. 72–73.

Publication II: Analog to Digital Converter, by E. H. Melan and E. C. Schuenzel, "IBM Technical Disclosure Bulletin," vol. 2, No. 2, August 1929, pp. 19 and 20.